US010539654B1

(12) United States Patent
Weichbrod

(10) Patent No.: US 10,539,654 B1
(45) Date of Patent: Jan. 21, 2020

(54) METHOD AND APPARATUS FOR PROVIDING WEATHER AND OTHER HAZARD INFORMATION TO AIRCRAFT INFLIGHT

(71) Applicant: ROCKWELL COLLINS, INC., Cedar Rapids, IA (US)

(72) Inventor: Shimon Weichbrod, Baltimore, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 634 days.

(21) Appl. No.: 15/143,137

(22) Filed: Apr. 29, 2016

(51) Int. Cl.
G01S 7/00 (2006.01)
G01S 13/95 (2006.01)
G01S 13/89 (2006.01)

(52) U.S. Cl.
CPC .............. *G01S 7/003* (2013.01); *G01S 13/89* (2013.01); *G01S 13/951* (2013.01)

(58) Field of Classification Search
CPC ....... G01S 7/0003; G01S 13/89; G01S 13/951
See application file for complete search history.

(56) References Cited

U.S. PATENT DOCUMENTS

| 8,599,064 | B2* | 12/2013 | Bunch | G01S 7/003 342/176 |
| 8,600,587 | B1* | 12/2013 | Seah | G08G 5/045 701/10 |
| 8,742,974 | B1* | 6/2014 | Sishtla | G01S 13/953 342/182 |
| 8,788,188 | B1* | 7/2014 | Bailey | G01W 1/08 701/120 |
| 2004/0239550 | A1* | 12/2004 | Daly, Jr. | G01S 13/723 342/26 B |
| 2015/0304813 | A1* | 10/2015 | Esposito | H04B 7/155 455/456.2 |

* cited by examiner

Primary Examiner — Vladimir Magloire
Assistant Examiner — Donald H B Braswell
(74) Attorney, Agent, or Firm — Suiter Swantz pc llo

(57) ABSTRACT

A system and method are provided for identifying weather hazard and other hazard information to aircraft in flight for direct graphical integration into situational awareness and other display components in the cockpit by transmitting the data over a comparatively low bandwidth information and/or data exchange connection with the aircraft. Graphically-displayed hazard information is provided for display on the aircraft cockpit display components in sufficient enough detail to support timely tactical decision making on the part of the pilots for hazard avoidance. The disclosed schemes provide a capacity to transmit higher fidelity hazard data to an aircraft over comparatively lower bandwidth systems by representing the hazard data by polygons to describe images, rather than describing the images on a much more cumbersome pixel-by-pixel basis. The disclosed schemes reduce the complexity of the image data without losing critical image information for producing comparatively higher-quality representations on currently-available aircraft cockpit system display components.

18 Claims, 7 Drawing Sheets

METHOD AND APPARATUS FOR PROVIDING WEATHER AND OTHER HAZARD INFORMATION TO AIRCRAFT INFLIGHT

BACKGROUND

The inventive concepts disclosed herein relate to systems and methods for providing weather hazard and other hazard information to aircraft in flight for direct graphical integration into situational awareness and other display components in the cockpit by transmitting the data over a comparatively low bandwidth information and/or data exchange connection with the aircraft, the graphically displayed hazard information providing sufficient detail to support tactical decision making on the part of the pilots or aircrew.

Modern commercial and business-type passenger and cargo aircraft are equipped with increasingly sophisticated avionics suites. Increasingly, data communications between the aircraft and the ground are used to facilitate information exchange with various nodes for administrative flight following, aircraft system monitoring, and alert and warning information which may be of use to the pilots or aircrew in the aircraft, or to the entities exercising administrative or operational control over the aircraft on the ground.

In modern aircraft cockpits, received data is often translated for graphical display on one or more graphical display components as cockpit design is increasingly dedicated to the use of such interactive displays for information display, and many aircraft control and monitoring functions. An objective is to provide the aircrew with easy-to-interpret information at a glance upon which they can make decisions regarding safe and efficient operation of the aircraft while airborne, and modify operations in response to certain unexpected conditions.

In the more than a decade since the introduction of the above-described graphical display components into the more modern "glass" cockpits of aircraft, and despite the increasing levels of sophistication in the data exchange and display components themselves, shortfalls still exist in a capacity to provide available information to a particular aircraft, and to translate that information for graphical display in the cockpit with a high enough quality, and in a consistent enough manner, to be usable to the aircrew. Among the reasons why such shortfalls exist is the necessity to "simplify" the information in order to accommodate, for example, bandwidth restrictions associated with providing the information to the aircraft.

A particular area in which the shortfalls are recognized is in the limited capacity for most current avionics systems and/or suites to provide access to weather threats via high-quality, easily-interpreted graphical display. Many modern aircraft include forward-looking radars for particularly detecting potential conflicting traffic. Such radars are also generally capable of detecting certain areas of inclement weather, and/or precipitation, particularly dense precipitation, directly in front of the aircraft. The radars have very limited, if any, capability to sense and display certain hazardous conditions, including pockets of turbulence, and/or to collect and display information regarding convective activity along the projected aircraft route of flight. In this regard, modern onboard avionics systems provide limited information regarding an area immediately in front of the aircraft, allowing the aircrew to make only short-term, last minute decisions regarding avoidance.

Current systems are generally incapable of displaying, in a usable manner, detailed graphical information available from ground sources regarding weather phenomena further along an expected route of flight. The requisite information exists by which to provide the aircrew situational awareness display information on one or more of the graphical display components in the cockpit for ease of interpretation. Current aircraft onboard installations, however, are generally incapable of receiving and displaying the available information in other than textual form, which must be further interpreted by the aircrew, except as comparatively low resolution images that may be available only for limited and/or pre-defined geographic areas.

These shortfalls are substantially based on limitations of the network and/or data exchange capabilities available with the avionics suites on board the aircraft, including via the Aircraft Communication and Reporting System (ACARS). ACARS in its many variations supports certain capacity by which to provide data inputs to the aircraft. On the message side, each individual ACARS data message is limited to 3,500 characters. This limitation makes it comparatively difficult to provide graphics information to the aircraft.

Differing techniques have been attempted to modify the graphics information for transmission via an ACARS data stream including attempts to represent binary graphical display information as text characters. Application of these differing techniques has, to date, yielded less than sufficient results in rendering graphical representations on the display components in the aircraft cockpit.

An additional recognized difficulty is that, once a particular configuration of equipment for data exchange and display is provided to achieve even limited success with graphical representation, the particular capability is often considered to be "built into the box." Put another way, a factor complicating the advancement of generic capabilities for graphical data integration and display in the cockpits of aircraft is the reality that the avionics components themselves tend to be limited to the individual production capabilities as they existed at the time of design and/or manufacture of the avionics components. There is generally no capacity to easily take advantage of newer and advancing weather reporting capacity and/or data compression technologies as they may become available, because the boxes are simply not designed to be adaptable. If a new weather product (or even a new technology to compress and/or display the information) becomes available, particular aircraft with dated communications and display components are likely incapable of incorporating the additional capabilities for use.

Attempts have been made at "sectoring" the data for graphical display by specifying pre-defined discrete areas of coverage. When an "end of map" (or "end of area") boundary is reached, however, up to four representations may need to be overlaid as the aircraft transitions through a corner of the represented area. Separately, differing mechanisms for image data reduction have been tried that are directed at (1) reducing the image scale (e.g., reducing the number of displayable colors or variations in displayable colors) and/or (2) reducing the image complexity (e.g., increasing a display area covered by each pixel to reduce an overall number of number of pixels to be received, interpreted and displayed). The applied reductions often result in severe limitation to the usefulness of the information and/or the usefulness of the resultant image.

The above-described shortfalls particularly adversely affect an ability to emulate radar representations on an ACARS display, but the shortfalls also affect other emulations and/or representations that have been attempted. While compression does help, the nature of weather products, such as radar, tend to increase in image complexity as weather activity deteriorates, leading to a reduction in the compressibility of the image, yielding an increase in the data size associated with the data when it is needed most. As a result, even as weather activity deteriorates, generating more data, thereby necessitating higher rather than lower fidelity, the increasing size of the required image data stream must be further adversely altered, usually by increasing the individual pixel size even over that which might be prescribed above regarding set levels of image data compression, resulting in even less information being made available to the aircrew when it is needed most.

Even for aircraft that support comparatively larger image data files, the larger data file sizes sent up to the aircraft for display in the cockpit takes several minutes (to tens of minutes) to deliver for display, and at significant cost. Additionally, increases in the complexity necessary to provide and present larger images tend to lead to higher failure rates in successful delivery to the aircraft for display.

Frustrated aircrew increasingly rely on their mobile personal electronic devices (PEDs) to provide higher quality data using high-speed satellite or ground based networks (when available) for the display of (weather) hazard information. Because these devices are not tied directly into the cockpit avionics, the aircrew must either hand enter the route to overlay, or attempt to visualize the route when viewing the weather products. Use of such devices for this purpose is generally unsanctioned and/or unapproved.

Even as new technologies are emerging to provide higher data throughput, these technologies are still considered years off in their particular implementations in addressing the difficulties presented in graphical display representation in ACARS or ACARS-like schemes in aircraft. Further, as with other newly-introduced capabilities, not only does a capability need to be demonstrated, but then certification of that capability needs to be undertaken for clearance for use on an aircraft flight deck.

SUMMARY

Exemplary embodiments of the systems and methods according to the inventive concepts disclosed herein may provide a ground-based image generation device that is usable to identify areas of hazard conditions in collected meteorological condition data, apply a first image processing technique to represent the identified areas of hazard conditions as first image data comprising a plurality of geographically-referenced polygons, identify an aircraft to receive image data regarding the identified areas of hazard conditions, recover aircraft flight following data for the identified aircraft, and limit the first image data comprising the plurality of geographically-referenced polygons to a subset of the polygons representing the identified areas of hazard conditions within a pre-determined range of a position of the aircraft according to the flight following data for the identified aircraft to obtain second image data. The second image data is then transmitted to the identified aircraft for direct integration as an image presentation on an image display in a cockpit of the identified aircraft.

These and other features and advantages of the disclosed systems and methods are described in, or apparent from, the following detailed description of various exemplary embodiments.

BRIEF DESCRIPTION OF THE DRAWINGS

Various exemplary embodiments of the disclosed systems and methods for providing weather hazard and other hazard information to aircraft in flight for direct graphical integration into a situational awareness or other display component in the aircraft cockpit over a comparatively low bandwidth information and/or data exchange connection with the aircraft, the graphically displayed hazard information providing sufficient detail to support a tactical decision making on the part of the pilots or aircrew of the aircraft, will be described, in detail, with reference to the following drawings, in which.

DETAILED DESCRIPTION

Figure 1:
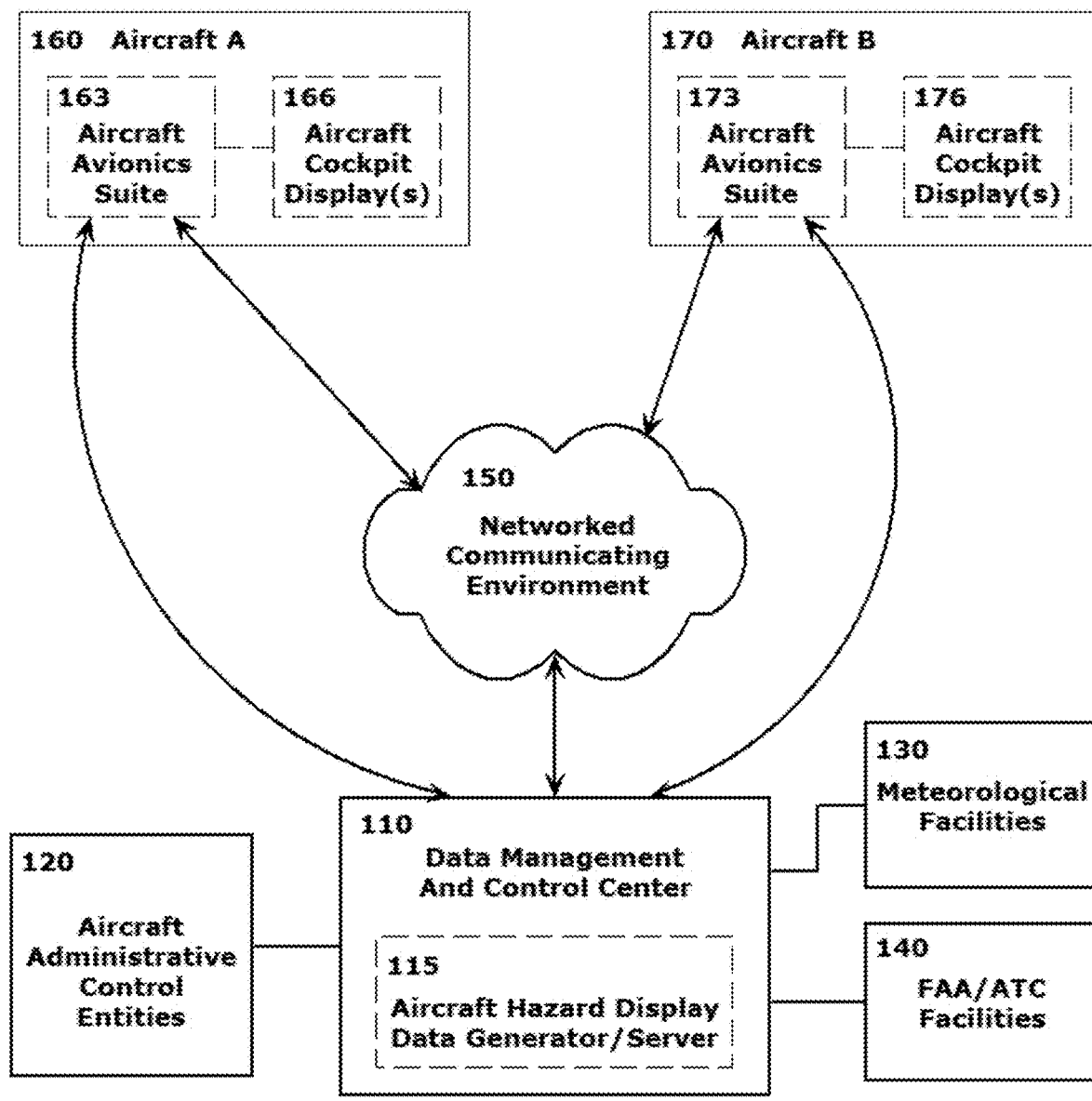
FIG. 1 illustrates an exemplary embodiment of an operating environment including a communication and control network in which an image data communication scheme according to the inventive concepts disclosed herein may be implemented.

The disclosed systems and methods for providing weather hazard and other hazard information to aircraft in flight for direct graphical integration into situational awareness and other display components in the cockpit by transmitting the data over a comparatively low bandwidth information and/or data exchange connection with the aircraft, the graphically displayed hazard information providing sufficient detail to support tactical decision making on the part of the pilots or aircrew, will generally refer to these specific utilities for those systems and methods. Exemplary embodiments described and depicted in this disclosure should not be interpreted as being specifically limited to any particular configuration of an aircraft avionics suite (including communications capabilities and cockpit image display components), or to any particular communication protocol by which information may be selectively transmitted as generated data streams to aircraft in flight for display on the cockpit image display components. Any advantageous use of the disclosed schemes and providing higher-fidelity hazard information for direct integration and display on various aircraft display components is contemplated. Further, the inventive concept disclosed herein may be equally applicable to other vehicular travel situations in which information may be prepared for direct integration into systems in those vehicles over comparatively low bandwidth communication protocols in order to provide the vehicle operators with real time, or near-real-time information regarding hazards in a particularly relevant geographic area that may affect operation of the vehicle according to a planned route.

The disclosed data generation and transmission schemes may be directed particularly at providing pilots and other aircrew of aircraft with displayed information that is relevant only to the route of flight on which they are on at a particular time. Initial information regarding the route of flight may be obtainable from sources that catalog, or otherwise file, flight plans for particular aircraft. The disclosed schemes may provide a streamlined representation-based coordination mechanism displaying hazard information in a timely enough manner to allow for the pilots or other aircrew to request, have approved, and initiate maneuvering to avoid the hazard areas represented.

As noted above, the systems and methods according to the inventive concept disclosed herein will be described as being particularly adaptable to employment scenarios in which weather information may be presented for integration and display in an aircraft cockpit. This focus is not intended to preclude the adaptability of the disclosed systems and methods to beneficial employment directed to other related purposes. Further, any reference to a particular employment scenario for a generated and transmitted data should be understood to be illustrative only in providing a descriptive real-world utility for the disclosed systems and methods, and should not be considered as limiting the disclosed systems and methods in any way.

Additional features and advantages of the disclosed embodiments will be set forth in the description that follows, and in part will be obvious from the description, or may be learned by practice of the disclosed embodiments. The features and advantages of the disclosed embodiments may be realized and obtained by means of the instruments and combinations particularly pointed out in the appended claims.

FIG. 1 illustrates an exemplary embodiment of an operating environment 100 including a communication and control network in which an image data generation and communication scheme according to the inventive concepts disclosed herein may be implemented. As shown in FIG. 1, the exemplary operating environment 100 may include a plurality of manned aircraft 160,170 operating in a particular region.

Each of the aircraft 160,170 may have an onboard aircraft avionics suite 163,173, respectively. Each respective aircraft avionics suite 163,173 may incorporate a plurality of communications components by which the aircraft 160,170 may exchange voice and data communications with other aircraft and ground-based facilities. Associated with the respective aircraft avionics suites 163,173 may be a series of cockpit components by which the pilots and/or aircrew may interact with the aircraft avionics suites 163,173. In increasing numbers, each of the respective aircraft avionics suites 163,173 may incorporate some number of aircraft cockpit displays 166,176. The various aircraft cockpit displays 166, 176 may be configured and arranged to facilitate providing information that is usable to the pilots and/or aircrew in evaluating internal operations of the aircraft 160,170, monitoring the status of myriad onboard systems, and safely and efficiently operating the aircraft 160, 170 according to normal and special procedures, particularly in responding to changing flight conditions.

The onboard aircraft avionics suites 163,173 may communicate with a number of many and widely disparate ground nodes. In the depiction shown in FIG. 1, many of the numerous lines of communication are omitted. The onboard aircraft avionics suites 163,173 may communicate directly with a data management and control center 110, or may communicate with data management and control center 110 via one or more network communicating environments 140.

In turn, the data management and control center 110 may communicate directly, or via a network communicating environment with a number of widely-dispersed and ground-based nodes. These nodes may include, but are not limited to, aircraft administrative control entities 120. These entities may be in a form of an airline, and airfreight cargo company, or the like. Other ground nodes may include meteorological facilities 130, FAA/ATC facilities 140, and other like facilities. Communications with these myriad facilities may be implemented to collect particular data from these data sources to be used in the disclosed hazard data generation and transmission schemes overseen by the data management and control center 110.

In implementing the disclosed schemes, the data management and control center 110 may include an aircraft hazard display data generator/server 115. In embodiments, the images and image products sent to the aircraft may be completely extracted, defined, manipulated, restructured, appended and transmitted to the aircraft by the aircraft hazard display data generator/server 115. In embodiments, image information would be provided in a geographically referenced format such that the avionics could place the image data appropriately on a display screen of a cockpit display component in a manner that replicates the desired image.

In embodiments, because the images sent to the aircraft may be appropriately limited to identifying hazards in a vicinity of a flight planned route, and otherwise hazards that exceed a pre-determined threshold the image data generated on the ground and transmitted to the aircraft can be greatly simplified according to the disclosed schemes to identify only those hazard areas that are, or would be, of concern to the pilots and/or aircrew of a particular aircraft executing a particular route of flight. Details of the operating components, units and/or functions of the aircraft hazard display data generator/server 115 will be described in detail below with reference to FIG. 6.

Figure 2:
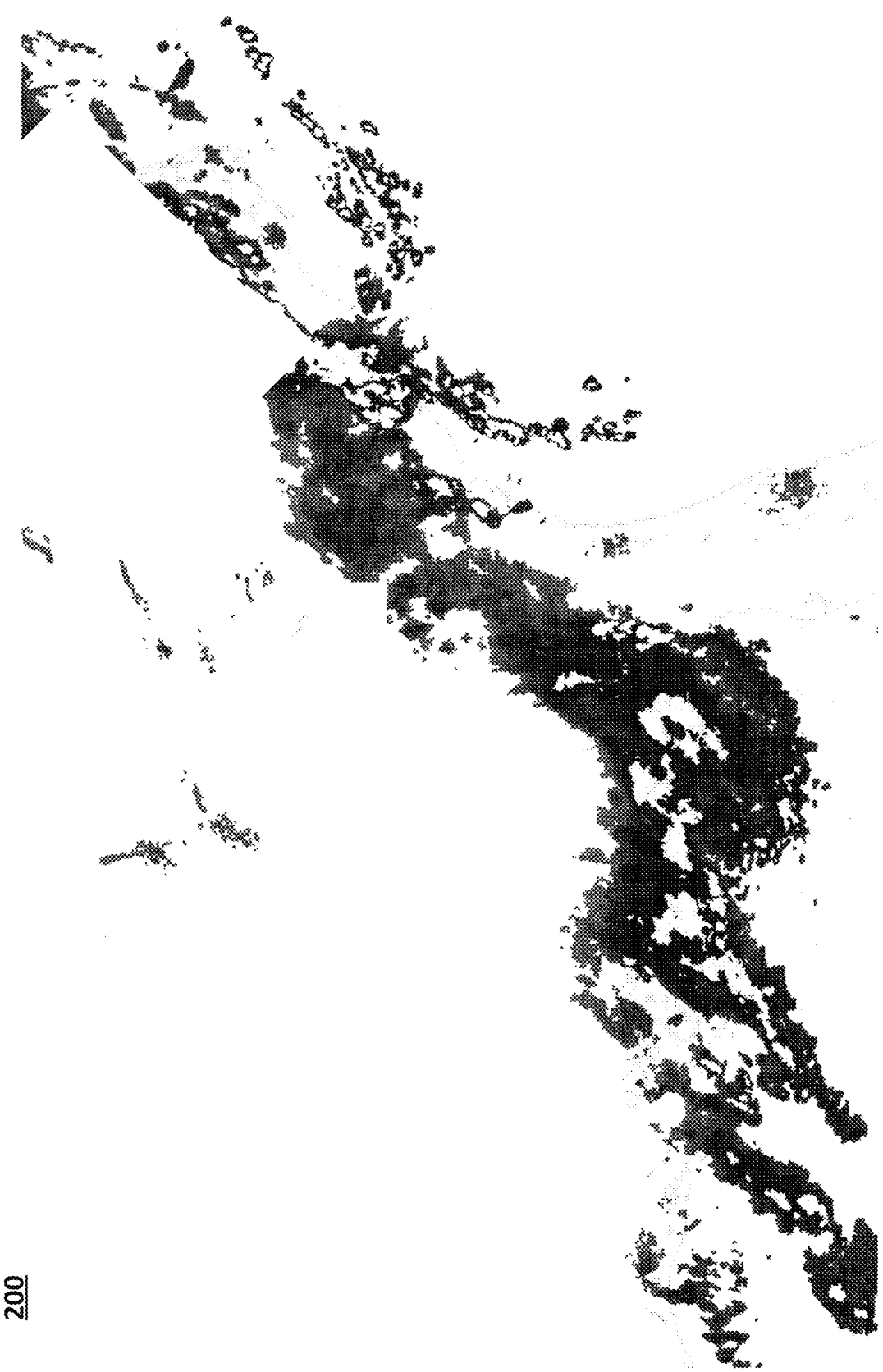
FIG. 2 illustrates an example of a typical radar image for the southeast United States that may be usable as an input for refinement according to the inventive concepts disclosed herein.

FIG. 2 illustrates an example of a typical radar image 200 for the southeast United States that may be usable as an input for refinement of an image product according to the inventive concepts disclosed herein. As shown in FIG. 2, as hazardous weather, turbulent conditions, and/or convective activity increase, ground-based weather radar systems are able to detect and "provide a picture" of the hazard areas in great detail, often indicating, according to a varying color scheme, areas of greater or lesser concern. It is easily understood that radar images, such as those typically seen displayed in broadcast media, or over the Internet, are very detailed. Further, as is commonly known, these images can often be separately animated. From a data formulation and reproduction standpoint, this complexity to the images renders them incompatible for transmission across low bandwidth communication links. A result is that image data that attempts to replicate a radar image is often delivered to an aircraft and displayed in a format that is significantly less helpful to the pilots and/or aircrew than it could be, or than the pilots and/or aircrew may desire. Even in the depiction shown in FIG. 2, it becomes clear that certain detail in the available ground-based image data is lost in processing of the image. Reduction in detail is one option to limit the size of any data stream to be transmitted to an aircraft. For example, a depiction of a range of intensity levels could be simplified from a rainbow scheme of 16 available colors to 4 or even 2 colors. Unfortunately, a result of this type of production may lead to invalid depictions of levels of intensity in one or more areas of a depicted image. As will be described in the following steps, and in the detailed discussion provided below, the disclosed inventive concepts include techniques that allow for a particular area of interest "as a hazard area" to be extracted from the typical radar image depiction to be conditioned through one or more image data shaping steps for transmission to an aircraft in a manner that greatly reduces the size of the data stream for supporting reproduction of the image on aircraft cockpit display components.

Figure 3:
FIG. 3 illustrates an example of an initially-extracted and first step refined version of image data generated according to the inventive concepts disclosed herein.

FIG. 3 illustrates an example of an initially-extracted and first step refined version of image data 300 generated according to the inventive concepts disclosed herein. As shown in FIG. 3, an intensity level may be selected such that only return echoes exceeding a particular threshold may be extracted for display. In this manner, selected data may be extracted before or after a polygonal image data representation scheme is applied to the raw image. A selection of image data representing a particular pre-determined threshold criteria may importantly reduce a number of individual polygons by upwards to 80% and a number of total vertices by upwards to 95%. Regardless of these reductions, however, the size of the image data may still exceed a capacity that could reasonably be transmitted to a particular aircraft. Further refinement process than may result in a depiction shown in FIG. 4. In this case, a process step of merging overlapping polygons may be undertaken that may further reduce the number of vertices.

Figure 4:
FIG. 4 illustrates an example of smoothed image data indicating one or more hazard areas generated according to the inventive concepts disclosed herein.

FIG. 4 illustrates an example of smoothed image data indicating one or more hazard areas generated according to the inventive concepts disclosed herein. As shown in FIG. 4, a next step in the image forming process may be undertaken in which the images smoothed in an effort to reduce further the number of vertices, which would reduce the size of the message data representing the image. Some level of smoothing may be applied to configure and optimum hazard area. The level of smoothing may be adjustable according to a limiting size of the data messages that are used to transmit the information from the ground-based image generation unit to the aircraft. The combination of these smoothing and refining processes may realistically reduce a number of vertices to less than 1% of the number of vertices that were initially identified, with essentially no loss in the detail to adequately display the pertinent hazard information.

Figure 5:
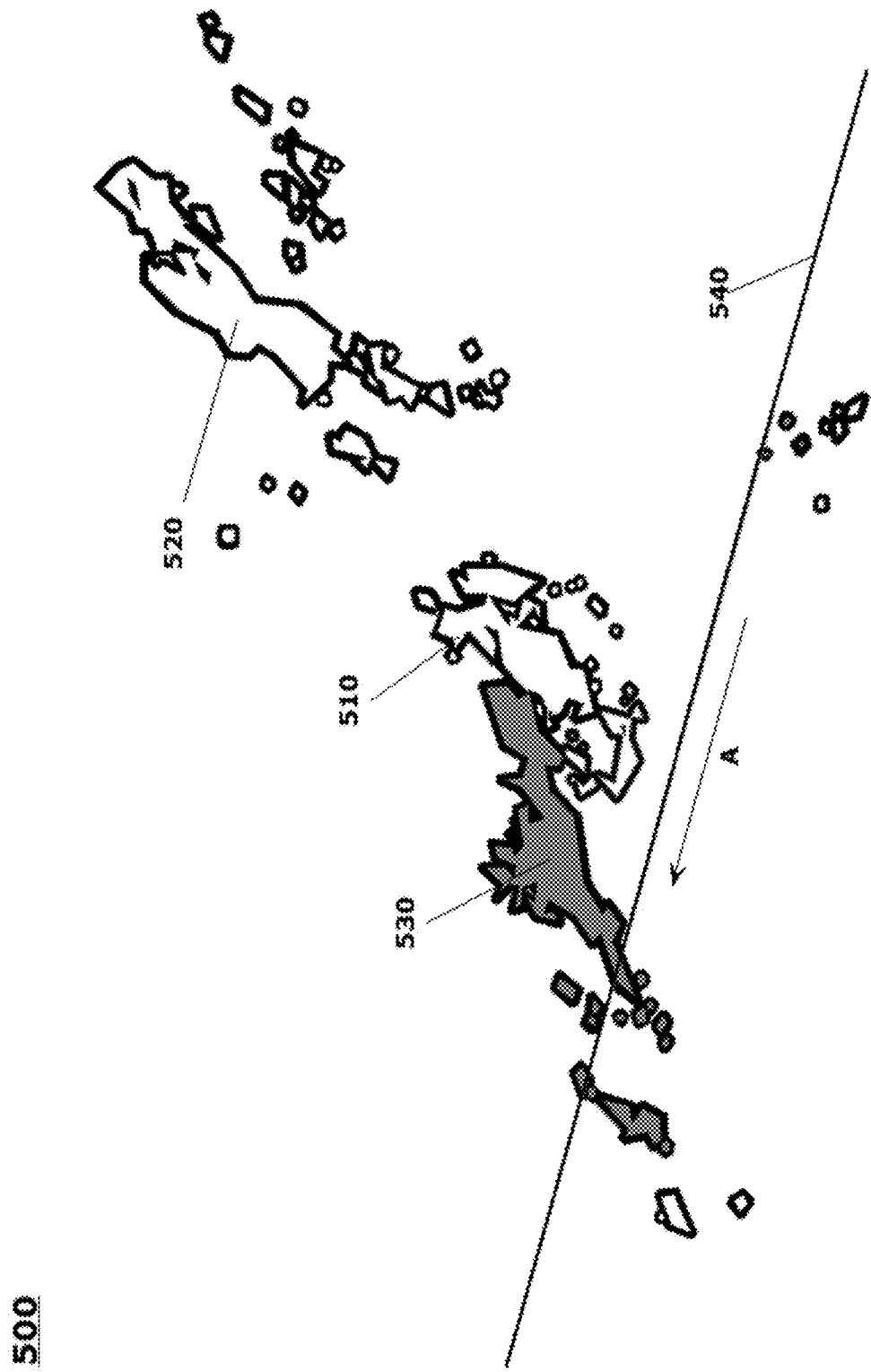
FIG. 5 illustrates an example of a deliverable image data product including identified hazard areas and buffering applied to the image product, and specific depiction of hazard areas that may at correct a particular flight planned route, according to the inventive concepts disclosed herein.

FIG. 5 illustrates an example of a deliverable image data product 500 including identified hazard areas and buffering applied to the image product, and specific depiction of hazard areas that may affect a particular flight planned route, according to the inventive concepts disclosed herein. Because the hazard areas are geo-referenced polygons (which may have appended to them meta data), individual hazard areas may be uplinked to the aircraft all at once or individually, and can be filtered to include those that intersect the particular route of flight. Metadata may include, for example, a particular avoidance area, allowing the avionics suite in the aircraft to increase the hazard area, if desired, or to provide the pilots or aircrew with notice to stay 10-20 nautical miles from it. In embodiments, these "buffered" image areas may be depicted as such.

As shown in FIG. 5, an image data (or depiction) product 500 may include the following elements. The image data product 500 may depict various areas identified hazardous conditions 510,520,530, and referenced particularly to an actual or flight-planned route 540 along which the aircraft may proceed in direction A. The varying hazard areas may include a particular hazard area 520 that, while defined, may be considered to have no potential impact on the route of flight of the aircraft and, therefore, may be omitted. The varying hazard areas may include a particular hazard area 510 that, while in proximity to the flight-planned route 540, may be evaluated as having little potential impact on the route of flight of the aircraft and therefore may remain depicted, but not necessarily highlighted as a hazard area to be avoided. According to the depicted flight-planned route 540, hazard area 510 is being, or will be, avoided. A benefit of a proximal hazard area such as hazard area 510 remaining on the display is that its presence may better inform the pilots or aircrew, in an event that it and of a submitted maneuver is executed, a "best" direction for executing that evasive maneuver. The varying hazard areas may include a particular hazard area 530 that may be evaluated to lie at least partially across the flight-planned route 540, and may, therefore, be evaluated as having significant potential to affect the route of flight of the aircraft. Such a hazard area 530 may be highlighted in a manner to specifically call the attention of the pilots and/or aircrew to its presence along their flight planned route. According to the depicted flight-planned route 540, hazard area 530 is being, or will be, encountered unless steps are taken by the pilots to maneuver the aircraft so as to avoid the particularly highlighted hazard area 530. In this context, it is important to note that only those areas including hazards that are evaluated to exceed a pre-determined threshold criteria are displayed. As such, in a situation in which a particularly highlighted hazard area 530 is indicated, the pilots and/or aircrew are alerted that evasive maneuvering should be executed according to known procedures, or according, for example, to overarching guidance provided by the entity that controls the operation of the aircraft from an administrative standpoint, e.g., an airline or commercial airborne freight company.

In embodiments, multiple different "hazard conditions" may be monitored, collated and analyzed to provide a depiction of a particular hazard area 530 to be avoided even if the depiction does not specify the particular hazard existing in that hazard area 530. The inclusion of meta data may aid in informing the pilots and/or aircrew regarding the nature of the hazard they are avoiding. Regardless, however, it is the ground-based system, referencing particularly pre-determined "not-to-exceed" criteria that lead to the rendering up the hazard areas in the manner shown generally in FIG. 5. A capacity to display additional areas, such as hazard area 520, may be dependent upon the efficiency of the data reduction techniques. It is recognized that pilots and/or aircrew may choose, from a situational awareness standpoint, to have all of the depicted information that may fit on the display screens in the cockpit. In embodiments, the disclosed systems may accommodate this desire to a maximum extent possible by implementing particular data reductions, even optimized for delivery via ACARS message, in order that the depictions may more apparent detail regarding an area surrounding the aircraft and its route of flight.

Figure 6:
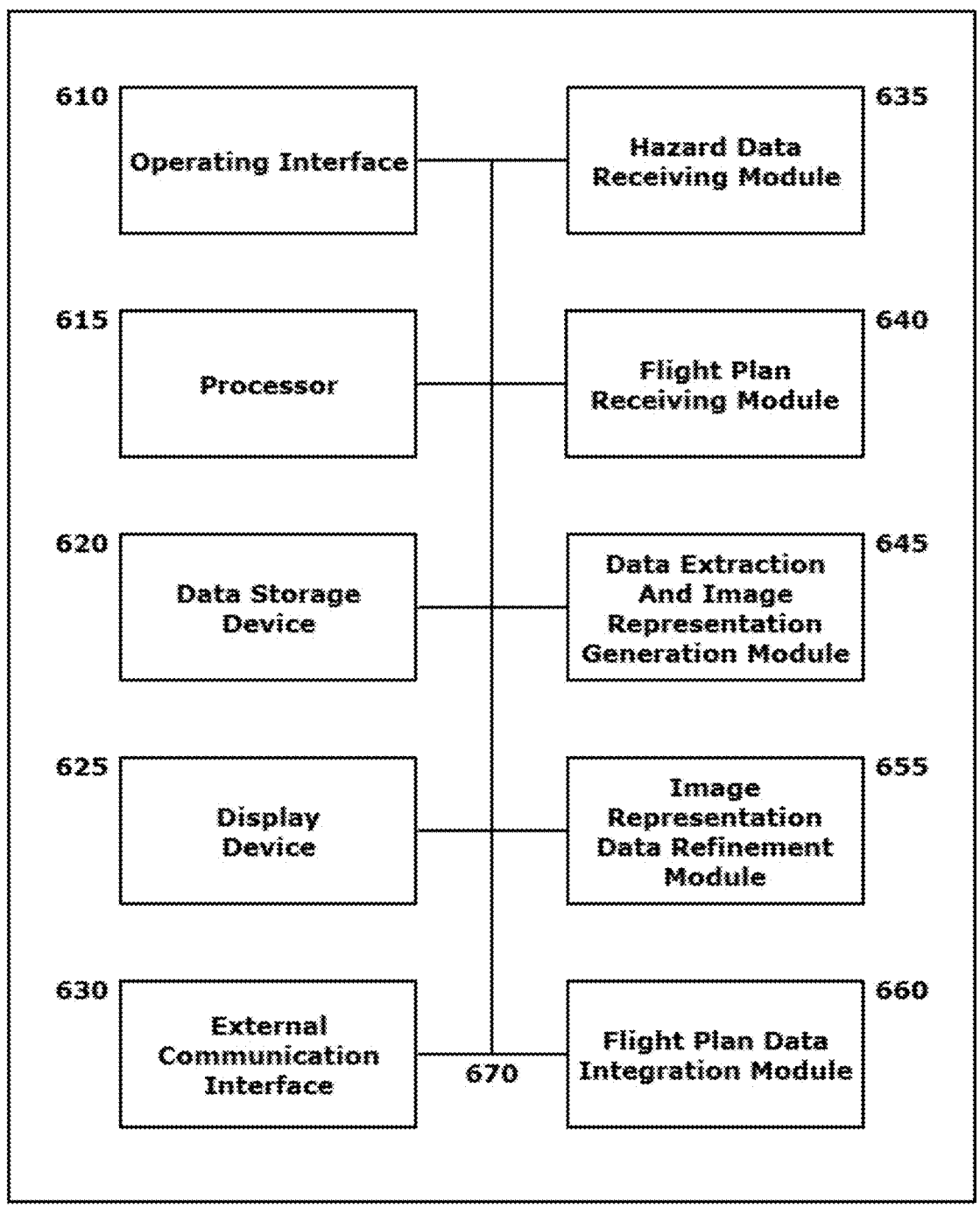
FIG. 6 illustrates an exemplary embodiment of a ground-based server system for generating and transmitting hazard image data to aircraft for display on the display components in the aircraft cockpit according to the inventive concepts disclosed herein.

FIG. 6 illustrates an exemplary embodiment of a ground-based server system 600 for generating and transmitting hazard image data to aircraft for display on the display components in the aircraft cockpit according to the inventive concepts disclosed herein.

The exemplary server system 600 may include one or more operating interface(s) 610 by which system commands may be introduced into the exemplary server system 600 by one or more users. Such operating interface(s) 610 may be a part, or a function, of a graphical user interface (GUI)

mounted on, integral to, or associated with, the exemplary server system 600. Otherwise, the operating interface 610 may take the form of any commonly-known user-interactive device by which a user input and/or commands are input to an automated processing system for communication and user interaction with exemplary server system components (physical or virtual). These commonly-known user-interactive devices may include, but not limited to, keyboards or touchscreens (including those associated with wireless communicating devices), a mouse or other pointing device, a microphone for providing verbal commands, or any other commonly-known operating interface devices.

The exemplary server system 600 may include one or more local processors 615 for carrying out the individual operations and functions of the exemplary server system 600. The processor(s) 615 may reference available hazard data from multiple sources and collect that hazard data together for reference, analysis and image representation data generation according to the disclosed schemes. The local processors 615 may also gain access to flight plan data by which to refine the image representation data that it generates in the manner described generally above.

The exemplary server system 600 may include one or more data storage devices 620. Such data storage device(s) 620 may be used to store data or operating programs to be used by the exemplary server system 600, and specifically the processor(s) 615 in carrying into effect the disclosed operations and functions for image representation data generation and transmission. Data storage device(s) 620 may be used to temporarily store collected information regarding a plurality of aircraft flight plans, and to store current weather data from which particular hazard information may be extracted for use.

The data storage device(s) 620 may include cloud-based data storage components, or otherwise may be in a form of a random access memory (RAM) or another type of dynamic storage device (actual or virtual) that is capable of storing updatable database information, and for separately storing instructions for execution of system operations by, for example, processor(s) 615. Data storage device(s) 620 may also include a read-only memory (ROM), which may include a conventional ROM device, a virtual ROM or another type of static storage device that stores static information and instructions for processor(s) 615. It is anticipated that the data storage device(s) 620 according to the disclosed schemes may generally be provided external to, and in wireless communication with, other system components. Such configuration does not, however, preclude the physical location of one or more data storage device(s) 620 in, for example, a data management and control center such as that shown in FIG. 1 Nor does such a proposed configuration preclude wired communications between system components and one or more of the data storage device(s) 620.

The exemplary server system 600 may include at least one display device 625, which may be configured as one or more conventional mechanisms that output information to a user, including, but not limited to, a digital data display screen associated with the exemplary system server 600. Such a local display device 625 may be provided for a user, for example, to visually monitor the image representation data generation process from an evaluation of radar data inputs such as those shown in FIG. 2 through the differing steps to arrive at a deliverable data stream including a representation such as that shown, for example, in FIG. 5.

The exemplary system server 600 may include one or more external communication interfaces 630 by which the exemplary system server 600 may communicate with each of the myriad data sources represented an exemplary manner in FIG. 1 by which the exemplary system server 600 may acquire hazard information, flight plan information, and other information by which to generate the image representation data according to the disclosed schemes. Further, several of the external communication interfaces 630 may be configured for communicating the generated image representation data across a comparatively low bandwidth communication connection with avionics suites in a plurality of airborne aircraft. These external data communication interfaces 630 are not limited in the communications protocols that they facilitate.

The exemplary server system 600 may include one or more of a series of particularized hazard image representation data generation implementing modules. Each of the below described modules may be, for example, a physical implementation, a virtual implementation, or a functional implementation, of a particular task undertaken by the exemplary server system 600 to carry into effect the disclosed schemes. In this regard, each of these modules may comprise a cloud-based server component or a physical server component as a stand-alone device, or as a function of a more generalized server system component, including one or more of the processor(s) 615.

The exemplary server system 600 may include a hazard data receiving module 335 that may be usable to communicate via one or more external communication interfaces 630 with a plurality of data sources for receiving current and forecast weather information including identification of particular meteorological hazard conditions for a particular region. Because all of the analysis may generally be undertaken by the exemplary server system 600, access to a full scope of available weather information and meteorological data from myriad different sources will support collection of better data upon which the disclosed schemes may be implemented. In embodiments, the hazard data receiving module 635 may otherwise be configured to communicate only with a certain number of select sources for weather information and meteorological data by which to form the basis for the application of the disclosed image representation data generation schemes.

The exemplary server system 600 may include a flight plan receiving module 640, which may be usable to communicate with multiple data sources for receiving flight plan information associated with a particular population of aircraft operating in a particular region at a particular time. As is noted above, one manner by which to reduce the overall size of any particular data stream directed any particular aircraft is to limit the information prepared for presentation on the display components in the cockpits of particular aircraft to information which is particularly germane to a location of that aircraft according to its flight planned route, with any deviations taken therefrom based on operational exigency. Based on this consideration, the flight plan receiving module 640 may communicate with aircraft operating entities, and/or FAA air traffic control facilities, in order to gain access to available flight plan information. In embodiments, particular aircraft, or aircraft operating companies, that may wish to avail themselves of a capability such as that supported by the exemplary system server 600 may communicate flight plans for their aircraft directly to the exemplary system 600 via the flight plan receiving module 640.

The exemplary server system 600 may include a data extraction and image representation generation module 645, which may be usable to analyze the received broad data regarding weather conditions and meteorological activity in order to extract from that data, or associated depictions, hazard data according to pre-defined thresholds and to apply to the extracted hazard data a polygonal image representation scheme in order to limit a size of an overall data package represented by the image data.

The exemplary server system 600 may include an image representation data refinement module 650, which may be usable to refine the image representation data generated above to be accommodated on a particular communication network, or according to a particular communication protocol to be communicated from the exemplary server system 600 to the particular aircraft for which the image representation data is generated. The image representation data refinement module 650 may also be usable to append certain metadata to the image representation data prior to transmission.

Because the image representation data sent to the aircraft may identify hazards that exceed a specific pre-determined threshold, as noted above, the image representation data can be greatly simplified to identify just germane hazard areas. Typically, the image representation data will be comprised of, or identified by, a set of points, lines or polygons. As the information is generally geographically referenced (geo-referenced), sets of objects can be grouped together or sent individually (based on sizing constraints). In addition, different "hazards" can even be sent in the same message, as the hazards themselves may be further defined by the metadata that is appended to the image representation data, and therefore received by the aircraft along with the image representation data.

Metadata that may be included, or associated, with each hazard object may encompass any one or more of the following:
1. Product Type
2. Color Scheme for the Display (e.g., color, opacity, outline/filled/hashed, etc.)
3. Value
4. Avoidance rules (e.g., avoid intersecting, remain X nautical miles from threat, and the like)
5. Valid Times (i.e., a Start time and/or and End time for avoidance of the hazard according to current or forecast meteorological development)
6. Actual or Forecast Movement (direction and speed)
7. Free Text Comments/Descriptors
8. Thresholds applied to the resultant image
9. Image ID (a unique identification for an image that may allow the avionics to confirm the image as received. A ground system could use the Image ID, in instances (1) when queried from the aircraft, to determine what information is currently present on the avionics before adding additional image information, or (2) to invalidate a current image or replace it with more up to date information)

In embodiments, the inclusion of meta data may facilitate expandability as new products become available. The avionics may, for example, process color, values, and valid times. Meta data information may be used to meet specific avionics manufacturers' specifications. For example, the buffer range may be automatically references to identify a proposed alternate route to the pilots or aircrew. Movement information may also be used to inform the pilots or aircrew, or to animate the hazard. The avionics may represent the metadata to the pilots or aircrew in some cooperative manner.

Each entity operating particular aircraft, or fleet of aircraft, may specify those elements of meta data that it desires to employ from among, for example, a menu of meta data elements that may be available in the avionics suite, as provided by the avionics manufacturer.

Analysis of the depictions as they are represented by images in the cockpit, in combination with the provided metadata, may provide the pilots or aircrew additional assistance in proposing new routes, calculating the movement information to infer future threats, and other like capabilities that make the image representations more "usable." It should be understood that providing this type of information to the pilots or aircrew in a standardized manner may be beneficial in assisting the pilots or aircrew in more quickly and interpreting the image representation, in providing a sufficient basis for informing timely and proactive reactions to hazard conditions as they arise specifically affecting the safe and efficient conduct of the operation of the aircraft along the flight planned route.

The exemplary server system 600 may include a flight plan data integration module 665 that may be usable to overlay a planned route of flight as may be available to the exemplary server system 600 to aid the pilots or aircrew in determining where and intended route of flight particularly crosses a specific hazard (see generally FIG. 5).

All of the various components of the exemplary server system 600, as depicted in FIG. 6, as is mentioned above, may be physical components, virtual components or combinations thereof connected internally within the exemplary server system 600, or separately and remotely, with each other, via combinations of wired and wireless communication pathways 670 to facilitate data exchange internally, with the various nodes with which the exemplary server system 600 may communicate, and with the aircraft avionics suites that are supported by the image representation generation schemes provided by the exemplary server system 600.

It should be appreciated that, although depicted in FIG. 6 as a series of separate discrete units with specific operating functionalities, the various disclosed elements of the exemplary server system 600 may be arranged in any combination of sub-systems as individual components or combinations of components, actual or virtual. In other words, no specific configuration of the exemplary server system 600 as an integral unit, or as a combination of supported components, is to be implied by the depiction in FIG. 6. Further, although depicted as individual units for ease of understanding of the details provided in this disclosure regarding the exemplary server system components, it should be understood that the described functions of any of the individually-depicted components may be undertaken, for example, by one or more physical or virtual processors within, connected to, and/or in communication with, the separate system components of the exemplary server system 600.

Figure 7:
FIG. 7 illustrates a flowchart of an exemplary method for implementing a scheme for generating and transmitting hazard image data to aircraft for display on the display components in the aircraft cockpit according to the inventive concepts disclosed herein.

The disclosed embodiments may include an exemplary method for implementing a scheme for generating and transmitting hazard image data to aircraft for display on the display components in the aircraft cockpit. FIG. 7 illustrates a flowchart of such a method. As shown in FIG. 7, operation of the method commences at Step S700 and proceeds to Step S705.

In Step S705, weather information and other meteorological hazard data may be acquired from multiple data sources in a ground-based server in the manner described above. Operation of the method proceeds to Step S710.

In Step S710, flight plan data may be acquired from multiple data sources in the ground-based server. Operation of the method proceeds to Step S715.

In Step S715, weather information and/or other meteorological hazard data may be isolated in an area of a flight planned route for a particular aircraft as specified according to the acquired flight plan data. Operation of the method proceeds to Step S720.

In Step S720, weather information other meteorological hazard data may be extracted that exceeds a particularly-defined pre-determined threshold. As indicated above, such a threshold may be set according to a particular user's desires, which may be communicated to, and stored in, the ground-based server. Operation of the method proceeds to Step S725.

In Step S725, the ground-based server may apply in image shaping scheme to the isolated and/or extracted weather information and other meteorological hazard data to produce image data. The image shaping scheme may define the particularly isolated and/or extracted data as image areas according to combinations of points, lines and/or polygons. Operation of the method proceeds to Step S730.

In Step S730, additional image refinement techniques may be applied to smooth the produced image data. An objective of these additional smoothing techniques may be to reduce an overall size of the image representation data file. As an example, overlapping polygons may be combined to reduce a total number of vertices. Operation of the method proceeds to Step S735.

In Step S735, the image data may be further defined by adding metadata to describe additional parameters regarding the hazard areas depicted according to the image data. Operation of the method proceeds to Step S740.

In Step S740, the image data may be further refined by specifying areas of image data to be delivered to a particular aircraft based on a current position of the aircraft, or on an aircraft flight planned route for the aircraft. Operation of the method proceeds to Step S745.

In Step S745, the refined image data, supplemented with appropriate metadata or otherwise, may be converted to an aircraft delivery format for delivery to the particular aircraft as final image data. In embodiments, the final image data may be converted to ACARS message data for delivery to the aircraft as a series of ACARS data message inputs. Operation the method proceeds to Step S750.

I Step S750, the final image data may be directed to the particular aircraft for receipt by the aircraft avionics suite in a format to facilitate direct integration into the cockpit display components. In embodiments, the final image data provides image representation data generated by the ground-based system for direct integration into the avionics suite of the particular aircraft, and particularly for direct integration in those cockpit display components, without requiring additional translation, supplementation, or other computing tasks of the aircraft onboard avionics suite. In embodiments, because individual elements of the data messaging include geographical referencing information for the individually-depicted hazard areas, or portions thereof, individual data messages can be independently represented on the cockpit display components in a manner that accurately represents the hazard area information so as to inform the pilots or aircrew of the presence of hazard areas along a route of flight for the aircraft, along with additional defining information presented as metadata to further inform a decision-making process for the pilots or aircrew. Operation of the method proceeds to Step S755, where operation of the method ceases.

The disclosed embodiments may include a non-transitory computer-readable medium storing instructions which, when executed by a processor, may cause the processor to execute all, or at least some, of the steps of the method outlined above.

The inventive concepts disclosed herein are directed at reducing a size of a ground-based image data representation by, rather than converting raw image data to individually pixilated data and sending the conversion of the individually pixilated data to the aircraft to be ineffectively displayed, imaging the data in a ground-based server to create polygons, which may be alternatively referred to as "megapixels," in a manner that retains requisite fidelity of the image representation. Progressively larger areas of the images may be specified as polygons to significantly reduce the total data stream.

The disclosed schemes beneficially optimize the image data by particularly referencing an area around an aircraft to which the data specifically pertains, and adapting the image data representation to that which will be particularly germane to the pilots or aircrew of the aircraft to which the image data is transmitted for presentation on the cockpit displays. Any reduction in image fidelity will be minimal on balance with the capacity to present a more complete representation of substantially all adverse activity in a vicinity of a particular aircraft. The ground-based server applies the requisite computer overhead necessary to formally, or otherwise generate, image data that reflects only the pertinent information for that particular aircraft, while discarding, or otherwise simply not transmitting, information that would not be immediately usable by the pilots or aircrew of the particular aircraft. With reference to FIG. 2, for example, a particular flight from Orlando to New Orleans is not concerned with meteorological activity farther up the East Coast as presented. Data sources are queried to provide enough information to identify where the aircraft is intended to be at time X in order that only the pertinent information is presented to the pilots or aircrew to enable their decision-making process with regard to avoiding the hazard areas presented in the images of down range information.

The disclosed embodiments allow the ground-based server, based on information regarding a particular route of flight for a particular aircraft, to define and generate the particular image representation data germane to that aircraft and then to push that information to the aircraft in a minimalist way. In embodiments, information can be limited to radar, radar winds and turbulence calculations or information according to a predetermined set of rules that may be selectable by individual entities for display in the aircraft under their control. An ability to implement the inventive concepts disclosed herein provides a capacity by which to shape and the size the data stream to fit the available communication link and for presentation according to the already built-in capabilities of the cockpit display components. A higher-quality higher fidelity image representation may be available in the cockpit based on the computing overhead being expended on the ground. In this manner, changes in the image representation data generating schemes are made in the ground-based servers thereby substantially "future-proofing" the onboard avionics components in order that, regardless of what new boxes and/or capabilities come on the line the provided image representation data may still be transmitted to the aircraft avionics suite for direct integration without any requirement by which to update an application in the receiver components.

The disclosed system may determine what hazards are. The all-source data may be referenced to determine where hazards exist that may affect a particular flight. Identification and depiction of the image data may be simplified as the abundance of available data will be parsed and generated for reference to a particular flight planned route (even as deviated) for transmission to the particular aircraft where appropriate. The presentation is going to be customized for delivery to the cockpit of the aircraft that will be affected by the hazard. Delta 459 flying from DC to Nashville will get different information from American 762 flying from Orlando to Key West.

The above-described exemplary systems and methods reference certain conventional components to provide a brief, general description of suitable operating environments in which the subject matter of this disclosure may be implemented for familiarity and ease of understanding. Although not required, embodiments of the disclosed systems, and implementations of the disclosed methods, may be provided, at least in part, in a form of cloud-based applications, hardware circuits, firmware, or software computer-executable instructions to carry out the specific functions described. The cloud-based applications, hardware circuits, firmware, or software-executable instructions may include individual program modules executed by the one or more processors. Generally, program modules include routine programs, objects, components, data structures, and the like that perform particular tasks or implement particular data types in support of the overall objective of the systems and methods according to this disclosure.

Those skilled in the art will appreciate that other embodiments of the disclosed subject matter may be practiced in generating image representation data in a streamlined form for direct delivery to, and integration in, the avionics suite of a particular aircraft.

As indicated above, embodiments within the scope of this disclosure may also include computer-readable media having stored computer-executable instructions or data structures that may be accessed, read and executed by one or more processors in differing devices, as described. Such computer-readable media can be any available media that can be accessed by a processor, general purpose or special purpose computer. By way of example, and not limitation, such computer-readable media may comprise RAM, ROM, EEPROM, CD-ROM, flash drives, data memory cards, virtual data components and structures, or other analog or digital data storage devices that may be used to carry or store desired program elements or steps in the form of accessible computer-executable instructions or data structures. When information is transferred or provided over a network or another communication connection, whether wired, wireless, or in some combination of the two, the receiving processor may properly view the connection as a computer-readable medium. Thus, any such connection is properly termed a computer-readable medium. Combinations of the above should also be included within the scope of the computer-readable media for the purposes of this disclosure.

Computer-executable instructions may include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions, or associated data structures, represents one example of a corresponding sequence of acts for implementing the functions described in the steps of the above-outlined exemplary method. The exemplary depicted steps may be executed in any reasonable order to carry into effect the objectives of the disclosed embodiments. No particular order to the disclosed steps of the method is necessarily implied by the depiction in FIG. 7, except where execution of a particular method step is a necessary precondition to execution of any other method step. In this regard, certain of the described steps in the method may be executed in parallel, and in near simultaneous timing.

Although the above description may contain specific details, they should not be construed as limiting the claims in any way. Other configurations of the described embodiments of the disclosed systems and methods are part of the scope of this disclosure. It will be appreciated that several of the above-disclosed and other features and functions, or alternatives thereof, may be desirably combined into many other different systems or applications. Although the above description may contain specific details, they should not be construed as limiting the claims in any way. Other configurations are part of the scope of the disclosed embodiments. For example, the principles of the disclosed embodiments may be applied separately to each individual user aircraft in the manner described. As such, each aircraft may be provided image representation data that is specifically optimized for presentation on the display components in each aircraft's cockpit. Each user may individually employ components of the disclosed systems and methods to their advantage without any reference to information being pushed to other users. This enables each user to enjoy the benefits of the disclosed embodiments even if any one of the large number of possible applications do not need some portion of the described functionality. In other words, there may be multiple instances of the disclosed systems each processing the content in various possible ways. It does not necessarily need to be one system used by all end users. Accordingly, the appended claims, and their legal equivalents, should only define the disclosed embodiments, rather than any specific example given.

I claim:

1. A weather hazard identification system, comprising:
   a communication device that communicates with a plurality of data sources to collect real-time and forecast meteorological condition data in image form and to collect aircraft flight following data;
   an image data generation device that is programmed to identify areas of hazard conditions in the collected meteorological condition data,
   apply a first image processing technique to represent the identified areas of hazard conditions as first image data comprising a plurality of geographically-referenced polygons,
   identify an aircraft to receive image data regarding the identified areas of hazard conditions,
   access aircraft flight following data for the identified aircraft, limit the first image data comprising the plurality of geographically-referenced polygons to a subset of the polygons representing the identified areas of hazard conditions within a pre-determined range of a position of the aircraft according to the flight following data for the identified aircraft to obtain second image data, and
   transmit second image data to the identified aircraft for integration as an image presentation on an image display in a cockpit of the identified aircraft, wherein the image data generation device being further programmed to append metadata to at least some of the plurality of polygons to provide additional information regarding at least one of the identified areas of hazard conditions, the metadata being transmitted with the second image data being transmitted to the identified aircraft for separate display as text, the metadata being transmitted with the second image data being transmitted to the identified aircraft for separate display as text includes avoidance rules for the hazard condition, valid times for avoidance of the hazard condition, and forecasted movement of the hazard condition, the forecasted movement including direction and speed.

2. The system of claim 1, the image data generation device being further programmed to identify the areas of hazard conditions in which a meteorological condition exceeds a predetermined threshold.

3. The system of claim 2, the image data generation device being further programmed to evaluate a plurality of meteorological conditions, and
identify the areas of hazard conditions in which any one of the plurality of meteorological conditions exceeds a predetermined threshold for the one of the plurality of meteorological conditions.

4. The system of claim 1, the image data generation device being further programmed to execute a second image processing technique in which overlapping polygons are merged to reduce a number of separate vertices in the first image data.

5. The system of claim 1, the flight following data being flight planned data specifying a planned route of flight for the identified aircraft.

6. The system of claim 1, the flight following data being real-time current position data for the identified aircraft.

7. The system of claim 1, the metadata specifying at least one parameter of a meteorological condition in the at least one of the identified areas of hazard conditions.

8. The system of claim 1, the metadata specifying at least one recommended action to be taken in avoiding the at least one of the identified areas of hazard conditions.

9. The system of claim 1, the metadata being transmitted with the second image data being transmitted to the identified aircraft for separate display as a text message on a display component in the cockpit of the identified aircraft.

10. The system of claim 1, the image data generation device being further programmed to translate the second image data to a predetermined data transfer protocol compatible with an avionics suite in the identified aircraft.

11. The system of claim 10, the predetermined data transfer protocol comprising translating the second image data into a plurality of Aircraft Communication and Reporting System (ACARS) data messages.

12. A method for generating weather hazard identification for transmission to an aircraft in flight, comprising:
accessing, by a processor, real-time and forecast meteorological condition data in image form from a first plurality of data sources;
accessing, by the processor, aircraft flight following data from a second plurality of data sources;
identifying, by the processor, areas of hazard conditions in the collected meteorological condition data;
applying, by the processor, a first image processing technique to represent the identified areas of hazard conditions as first image data comprising a plurality of geographically-referenced polygons;
identifying, by the processor, an aircraft to receive image data regarding the identified areas of hazard conditions;
accessing, by the processor, aircraft flight following data for the identified aircraft; limiting, by the processor, the first image data comprising the plurality of geographically-referenced polygons to a subset of the polygons representing the identified areas of hazard conditions within a pre-determined range of a position of the aircraft according to the flight following data for the identified aircraft to obtain second image data;
transmitting the second image data to the identified aircraft for direct integration as an image presentation on an image display in a cockpit of the identified aircraft;
appending, by the processor, metadata to at least some of the plurality of polygons to provide additional information regarding at least one of the identified areas of hazard conditions, the metadata specifying at least one of (1) a parameter of a meteorological condition in the at least one of the identified areas of hazard conditions and (2) a recommended action to be taken in avoiding the at least one of the identified areas of hazard conditions, wherein the metadata is presented as text, the metadata being presented as text includes avoidance rules for the hazard condition, valid times for avoidance of the hazard condition, and forecasted movement of the hazard condition, the forecasted movement including direction and speed.

13. The method of claim 12, further comprising identifying, by the processor, the areas of hazard conditions by identifying an area in which at least one of a plurality of the meteorological conditions exceeds a predetermined threshold.

14. The method of claim 12, further comprising executing, by the processor, a second image processing technique in which overlapping polygons are merged to reduce a number of separate vertices in the first image data.

15. The method of claim 12, the flight following data being at least one of (1) flight planned data specifying a planned route of flight for the identified aircraft and (2) real-time current position data for the identified aircraft.

16. The method of claim 12, further comprising transmitting the metadata with the second image data to the identified aircraft for separate display as a text message on a display component in the cockpit of the identified aircraft.

17. The method of claim 12, further comprising translating, by the processor, the second image data to a predetermined data transfer protocol compatible with an avionics suite in the identified aircraft.

18. The method of claim 17, the predetermined data transfer protocol including a plurality of Aircraft Communication and Reporting System (ACARS) data messages.

* * * * *